(12) United States Patent
Navarra Pruna

(10) Patent No.: US 8,469,696 B2
(45) Date of Patent: Jun. 25, 2013

(54) SLIDE MECHANISM FOR THE MOLDING AND EJECTION OF PARTS MOLDED WITH NEGATIVES FOR AN INJECTION MOLD

(75) Inventor: Albert Navarra Pruna, Barcelona (ES)

(73) Assignee: Comercial de Utiles y Moldes, S.A., Sant Just Desvern (Barcelona) (ES)

( * ) Notice: Subject to any disclaimer, the term of this patent is extended or adjusted under 35 U.S.C. 154(b) by 358 days.

(21) Appl. No.: 12/920,536

(22) PCT Filed: Nov. 24, 2009

(86) PCT No.: PCT/ES2009/070524
§ 371 (c)(1),
(2), (4) Date: Sep. 1, 2010

(87) PCT Pub. No.: WO2010/061026
PCT Pub. Date: Jun. 3, 2010

(65) Prior Publication Data
US 2011/0003027 A1    Jan. 6, 2011

(30) Foreign Application Priority Data
Nov. 26, 2008 (ES) .................................. 200803363

(51) Int. Cl.
*B29C 45/44* (2006.01)
(52) U.S. Cl.
USPC 425/556; 425/577; 425/DIG. 5; 425/DIG. 58
(58) Field of Classification Search
USPC ....................... 425/556, 577, DIG. 58, DIG. 5
See application file for complete search history.

(56) References Cited

U.S. PATENT DOCUMENTS

| | | | | |
|---|---|---|---|---|
| 548,895 | A * | 10/1895 | Stapes | 425/422 |
| 2,529,091 | A * | 11/1950 | Lester | 249/57 |
| 3,865,529 | A * | 2/1975 | Guzzo | 425/556 |
| 4,101,256 | A * | 7/1978 | White et al. | 425/441 |

(Continued)

FOREIGN PATENT DOCUMENTS

| | | |
|---|---|---|
| DE | 19507009 A1 | 8/1996 |
| DE | 102005011311 B3 | 5/2006 |
| ES | 2219196 | 11/2004 |
| ES | 2220158 | 12/2004 |

OTHER PUBLICATIONS

International Search Report dated Mar. 15, 2010 from the corresponding PCT/ES2009/070524.

*Primary Examiner* — Yogendra Gupta
*Assistant Examiner* — Emmanuel S Luk
(74) *Attorney, Agent, or Firm* — Katten Muchin Rosenman LLP

(57) ABSTRACT

The invention relates to a slide mechanism comprising
an ejector shaft (2) with a first end portion (2c) attached to a mobile ejector plate (3), a second conical end portion (2a) which ends in a protrusion (2b) coupled to a cam (6), the protrusion (2b) acting as a rotation shaft on which the cam (6) can oscillate;
a wedge-shaped slide (5) with a molding portion (5d), an inclined segment (5a) between a push surface (5b) which is in contact with the part to be obtained (10) and a base segment (5c) and a sliding passage (14) which extends through the slide (5) in which at least one portion of the cam (6) slides in parallel with the negative (11a);
a fixed sliding support (4) with an axial passage (4a) through which the ejector shaft (2) axially slides, and a slope (4c) on which the inclined segment (5a) of the slide (5) shifts, with a complementary inclination to that of the inclined segment (5a) of the slide.

22 Claims, 12 Drawing Sheets

U.S. PATENT DOCUMENTS

| | | | | |
|---|---|---|---|---|
| 4,515,342 | A * | 5/1985 | Boskovic | 249/122 |
| 4,832,307 | A * | 5/1989 | Watanabe et al. | 249/63 |
| 5,281,127 | A * | 1/1994 | Ramsey | 425/556 |
| 5,551,864 | A * | 9/1996 | Boskovic | 425/556 |
| 5,603,968 | A * | 2/1997 | Tajiri et al. | 425/556 |
| 5,773,048 | A * | 6/1998 | Ramsey | 425/556 |
| 5,814,357 | A * | 9/1998 | Boskovic | 425/556 |
| 5,879,611 | A * | 3/1999 | Takahashi et al. | 264/275 |
| 6,039,558 | A * | 3/2000 | Park et al. | 425/556 |
| 6,416,315 | B1 * | 7/2002 | Ciccone | 425/556 |
| 6,474,977 | B1 * | 11/2002 | Wimmer | 425/556 |
| 6,491,513 | B1 * | 12/2002 | Schneider | 425/577 |
| 6,604,934 | B2 * | 8/2003 | Ciccone et al. | 425/556 |
| 7,153,126 | B2 * | 12/2006 | Takao | 425/444 |
| 7,387,505 | B1 * | 6/2008 | Chen et al. | 425/190 |
| 7,393,490 | B2 * | 7/2008 | Matsunaga | 264/318 |
| 7,435,079 | B2 * | 10/2008 | Wang et al. | 425/577 |
| 7,481,648 | B1 * | 1/2009 | Chen et al. | 425/441 |
| 7,559,763 | B2 * | 7/2009 | Cipkar | 425/577 |
| 8,029,267 | B2 * | 10/2011 | Takao | 425/444 |
| 8,137,442 | B2 * | 3/2012 | Pintault et al. | 96/11 |
| 8,142,185 | B1 * | 3/2012 | Li et al. | 425/556 |
| 8,197,246 | B1 * | 6/2012 | Wang et al. | 425/556 |
| 8,241,031 | B2 * | 8/2012 | Starkey et al. | 425/556 |
| 2002/0048618 | A1 * | 4/2002 | Pruna | 425/556 |
| 2004/0109913 | A1 * | 6/2004 | Drees | 425/556 |
| 2005/0042322 | A1 * | 2/2005 | Takao | 425/443 |
| 2007/0243286 | A1 * | 10/2007 | Wang et al. | 425/577 |
| 2010/0124581 | A1 * | 5/2010 | Huang | 425/556 |
| 2010/0278963 | A1 * | 11/2010 | Ni et al. | 425/556 |
| 2011/0020490 | A1 * | 1/2011 | Starkey et al. | 425/556 |
| 2011/0262583 | A1 * | 10/2011 | Lin | 425/556 |
| 2012/0183641 | A1 * | 7/2012 | Shih | 425/577 |

* cited by examiner (A-A)

SLIDE MECHANISM FOR THE MOLDING AND EJECTION OF PARTS MOLDED WITH NEGATIVES FOR AN INJECTION MOLD

TECHNICAL FIELD OF THE INVENTION

The present invention is comprised in the technical field of injection molds for manufacturing plastic parts and, particularly in the sector of mechanisms for molding and ejection in plastic injection molds.

BACKGROUND OF THE INVENTION

Currently, in the field of injection molds and particularly, in injection molds for obtaining molded plastic parts which have negatives and which, therefore, cannot be demolded by conventional demolding systems, the use of angular shifting mechanisms associated with the mold is required, such that the demolding of these negatives is facilitated without complicating the molding cycle as a result. Mechanisms of this type, described for example in patent application ES-A-2219196, comprise an ejector shaft with a first end portion attached to a mobile ejector plate which shifts in an axial plane, and a second end portion coupled by means of a coupling element to a slide comprising a molding portion provided with a geometry of at least one negative of a molded part and a push surface which are in contact with the molded part during molding, as well as a radially inclined segment with respect to said axial plane.

This mechanism further comprises a fixed sliding support with a slope with a complementary inclination with respect to the inclination of the inclined segment of the slide and on which the inclined segment of the slide shifts, such that when the ejector shaft pushes the slide towards the part to be obtained, the slide shifts through the slope along an inclined shifting path, such that the molding portion is separated from the part to be obtained. The mechanisms require complex machining because it cannot be performed perpendicular and therefore requires complex mechanisms and adjustments that are hard to carry out.

In mechanisms of this type it is very important to pay special attention to the tolerances of all the components comprising the set of this portion of the mold because any variation on the height of these elements distorts the adjustment of the system, greatly complicating its operation. Depending on the height of the mold, the distance separating the runners located in the ejector plates of the mold to the slide through the inclined guide causes a separation which forces a very high force for extracting the plastic part, which requires oversizing the ejector plates for the purpose of withstanding the force required for shifting the slide from the ejector plates themselves.

Spanish invention patent application ES-A-2220158 describes a mechanism for the molding and the expulsion of negatives in injection molds with a relatively simplified construction with respect to other previously existing mechanisms, which allows reducing manufacturing costs and times. Although this mechanism is advantageous, it has a constructive configuration which is essentially intended for a part with a specific design with its respective negatives, which involves the need for a specific construction for each type of part. Furthermore, on some occasions due to the shape of the part, it is necessary for the constructive configuration to be more complex in order to extract the part because it cannot be vertically extracted and on some occasions it increases the complexity to the point in which the shaft associated with the ejector plate works at an angle of inclination with respect to the vertical ejection shaft for ejecting the part.

Based on the foregoing, there is a need to find an improved constructive solution which provides greater versatility.

DESCRIPTION OF THE INVENTION

The object of the present invention is to overcome the drawbacks of the state of the art described above by means of a slide mechanism for negatives inside plastic molds which further provides other additional advantages which will be evident from the description included below, comprising at least one ejector shaft with a first end portion attached to a mobile ejector plate which shifts in an axial plane, and a second end portion coupled by means of a coupling element to a slide comprising a molding portion provided with a geometry of at least one negative of a molded part which extends through the slide, a base segment and a push surface which are in contact with the molded part during molding, as well as a radially inclined segment with respect to said axial plane;

a fixed sliding support with a slope with a complementary inclination with respect to the inclination of the inclined segment of the slide and on which the inclined segment of the slide shifts and with a base provided with an axial guiding passage through which the ejector shaft axially slides;

wherein the slide comprises a sliding passage which extends through the slide at least partially and in parallel with the negative; and the coupling element is attached to the second end portion of the ejector shaft and fits at least partially in a sliding manner in the sliding passage.

As a result of these features, a mechanism is obtained, which mechanism, by means of a constructively simplified solution and with a low manufacturing cost, allows the demolding of parts having negatives, always acting by means of ejector shafts arranged in the axial direction and perpendicular with respect to the ejector plates such that when the ejector shaft pushes the slide towards the part to be obtained, the slide shifts through the slope along an inclined shifting path such that the molding portion is separated from the part to be obtained.

The coupling element is a bar fixedly attached to the second end of the ejector shaft. Nevertheless, in a preferred embodiment the coupling element is a cam, and the second end portion of the ejector shaft ends in a protrusion coupled to the cam, the protrusion acting as a rotation shaft in which the cam can oscillate.

This preferred embodiment has the advantage that the oscillating capacity of the cam can use slides for obtaining negatives with very different geometries and angles such that it is a tool with a greater versatility than the mechanisms of the prior state of the art.

In this preferred embodiment, the second end portion of the ejector shaft can be conical, and the protrusion can have a diameter greater than the end of said second end portion of the ejector shaft. In turn, the protrusion of the end portion of the ejector shaft can be cylindrical, in which case the cam can comprise a grooved segment provided with an inner first portion having a circle segment section in which there is housed the protrusion of the ejector shaft, an restriction-type intermediate portion and an outer third portion having facing side walls inclined convergently towards the intermediate portion, the protrusion being housed in the first portion of the grooved segment of the cam such that the cam can oscillate in said protrusion.

In one embodiment of the invention, when the cam is made of steel or iron or of an alloy comprising iron or steel, the protrusion arranged at the end of the ejector shaft can comprise a magnet, such as a magnet housed inside a cavity provided in the protrusion for example. The purpose of such magnet is to cause the attraction of the cam for the purpose of preventing the involuntary separation of the two parts, cam and protrusion, attached to one another.

In another embodiment, the sliding support comprises at least one side guide which enters a guiding recess of the slide, the side guide and the guiding recess having the same orientation as the slope of the sliding support.

In yet another embodiment, the sliding support comprises two side guides which respectively enter respective guiding recesses provided in opposite sides of the slide, the side guides and the guiding recesses having the same orientation as the slope of the sliding support.

The fixed sliding support can be fixed to the injection mold in which case the sliding support preferably comprises fixing means for fixing it to the injection mold such as, for example, one or more threaded passages in which the corresponding screws or bolts are screwed.

The slide can be a wedge-shaped element in which the inclined segment extends between the push surface and the base segment which is narrower than the push surface. The slide can also be provided with an adaptable portion intended for the insertion of a detachable element which can be disassembled. This adaptable portion or area allows coupling a detachable element with the molding portion of the slide, which facilitates the machining of the design to be molded in this detachable element as a result of allowing the interchangeability of the molding portion of the slide adapted to the area to be molded of the part to be molded, and thus facilitating its post-sale service or maintenance.

The sliding passage in the slide can be tunnel-shaped and extend through the slide close to the base segment. Alternatively, the sliding passage can be channel-shaped and open or half open towards the ejector plate.

For anchoring the ejector shaft in the ejector plate, the first end of the ejector shaft can be a threaded end which screws in a complementary hole in the ejector plate, or in a hole of an anchoring part immobilized in a complementary hole in the ejector plate.

In this second case, the ejector plate can be comprised by an anchoring plate with said complementary hole and a bottom plate attached to one another, and the anchoring part can be cylindrical and comprise a first portion, a second portion and a perimetric step between the first and the second portion, the first portion having a smaller diameter than the second portion. In this case, the hole in the anchoring plate is a through hole, with a narrowed segment in the outer portion of the anchoring plate and a wider segment in the body of the anchoring plate.

The segments of the through hole are respectively sized in correspondence with the first and the second cylindrical portion of the anchoring part, such that the first cylindrical portion of the anchoring part is housed in or even extends through the narrowed segment of the through hole and the second cylindrical portion is inserted in the wider segment of the through hole, the parametric step being supported against the edge of the narrowed segment of the through hole. In turn, the bottom plate closes the wider segment of the through hole in the anchoring plate. The wider portion of the through hole is closed by the bottom plate such that the anchoring part is axially immobilized between the narrowed segment of the through hole and the bottom plate.

The hole, whether it is a hole in the same ejector plate or the hole in the anchoring part, in which the threaded end of the ejector shaft is screwed is provided with an anti-rotation element made of a synthetic material capable of withstanding the thermal and mechanical conditions to which the operation of the mold is subjected, such as synthetic rubber, a fluoropolymer elastomer, or a similar material. The anti-rotation element can be at least one washer or a coating provided on the wall of the hole.

BRIEF DESCRIPTION OF THE DRAWINGS

Aspects and embodiments of the invention are described below based on the drawings, in which.

Figure 1:
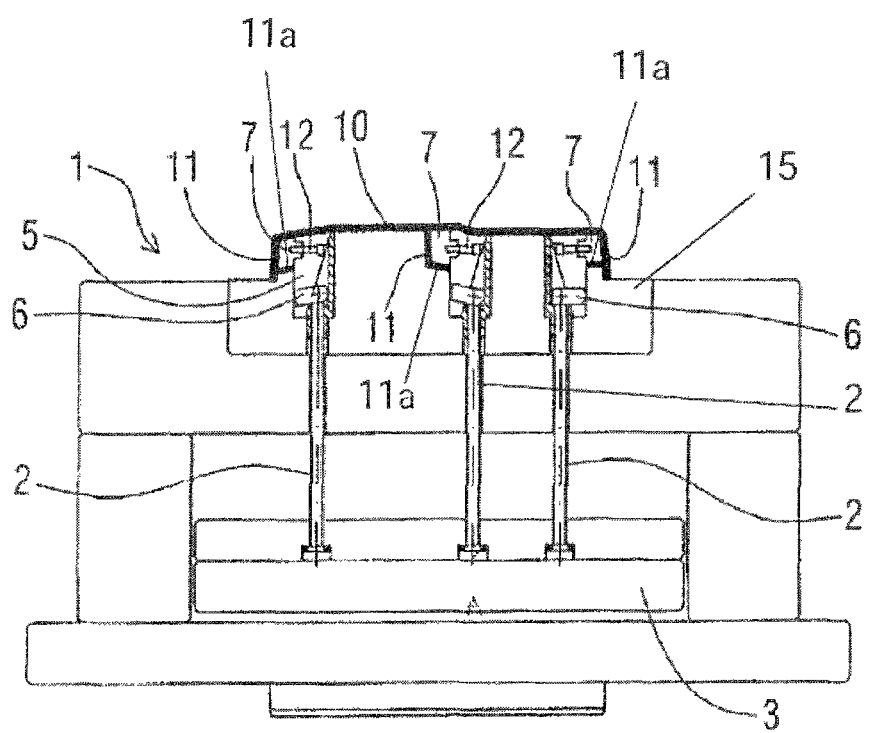
FIG. 1 is a schematic cross-section view of an embodiment of the slide mechanism for the molding and ejection of negatives according to the present invention in a molding position.

Reference numbers identifying the following elements can be seen in these figures:
1 slide mechanism
2 ejector shaft
2a considerably cone-shaped end portion
2b protrusion
2c threaded end
3 ejector plate
3' anchoring plate
3" bottom plate
3a through hole
4 sliding support
4a guiding passage
4b housing segment
4c slope through which the slide slides
4d housing for screwing to the mold
4e base
4f side guide
4g distal portion
5 slide
5a inclined segment
5b push surface
5c base segment
5d molding portion
5e guiding recess
6 cam
7 extractable detachable element
8 grooved segment
8a inner portion
8b restriction-type portion
8c third portion
9 magnet
10 part to be obtained
11 lower prolongation
11a negative of the lower prolongation
12 screw
13 housing of the slide
14 sliding passage
15 mold
16 anchoring part
16a blind hole
16b parametric step
16c anti-rotation washer
17 lock screw
17a passage
17b threaded hole

EMBODIMENTS OF THE INVENTION

The attached FIGS. 1 to 4 show a segment of a mold -15- for manufacturing plastic parts by injection which is provided with slide mechanisms according to the invention for the molding and ejection of negatives generally referenced with -1-.

As can be seen, this slide mechanism comprises an ejector shaft -2- perpendicular and fixed to a mobile ejector plate -3- which can shift axially upwards and downwards (indicated by means of arrows in FIG. 2) and a slide -5- in which there is defined a geometry to be reproduced in a part to be obtained -10- comprising lower prolongations -11- with negatives -11a-.

Figure 4:
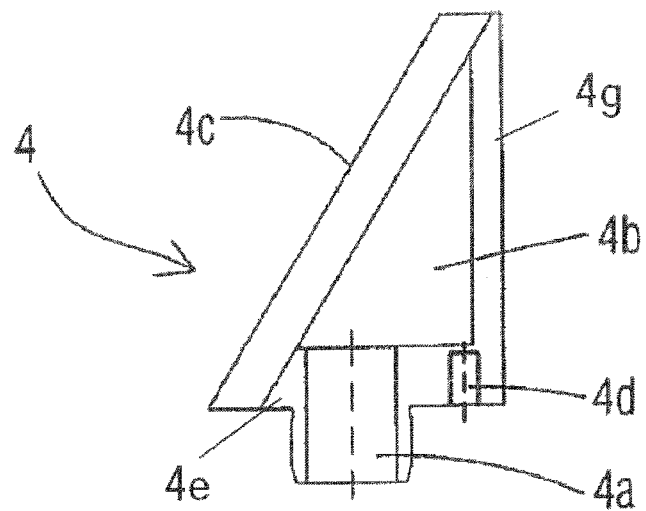
FIG. 4 is a schematic cross-section view of an embodiment of the sliding support forming part of the mechanism of the invention.
Figure 5:
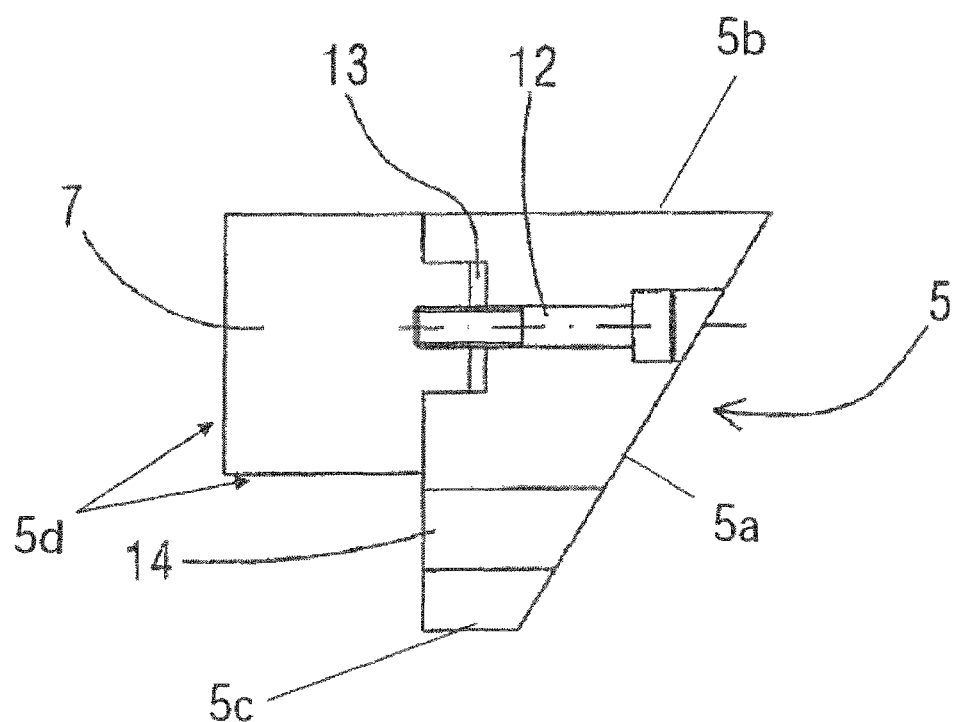
FIG. 5 is a detailed schematic cross-section view of the slide provided with a detachable element.

The ejector shaft -2- is provided at its upper end with a cam -6-, susceptible of oscillating, said cam -6- being slidable in a sliding passage -14- which extends through a tunnel-shaped slide -5- (FIG. 5). The slide mechanism further comprises a sliding support -4- (FIG. 4) fixed in the mold -15- in which the slide -5- slides and which is pushed by the ejector shaft -2- through a guiding passage in the form of a guide bushing -4a- provided in the sliding support -4-. The ejector shaft -2- thus adopts an arrangement perpendicular to the ejector plate -3- and is axially oriented in the same direction as the ejection shifting direction of the part -10-.

Figure 3:
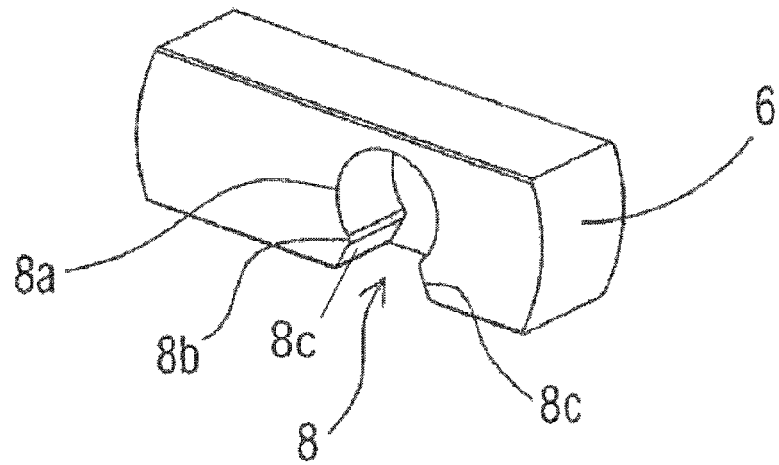
FIG. 3 is a detailed schematic view of a cam provided in the mechanism of the invention.

As can be seen in FIG. 3, the cam -6- has a grooved segment -8- provided with an inner first portion -8a- in the form of a circle segment, a restriction-type second portion -8b- and two third portions -8c- respectively located between the first portion -8a- and the lower portion of the cam -6- with the side walls thereof inclined in directions opposite to one another.

Figure 10:
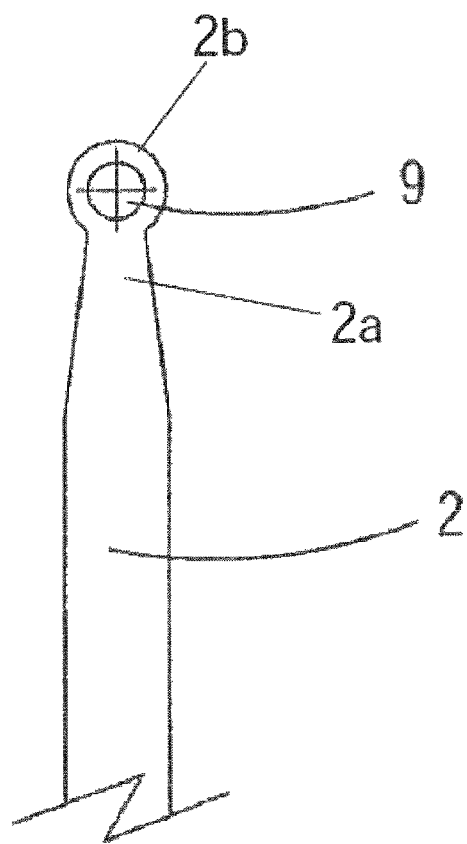
FIG. 10 is a schematic elevational view of a segment of the ejector shaft.

In turn, the ejector shaft -2- (see FIGS. 6, 8 and 10) is provided at its free end with a considerably conical end portion -2a- which ends in a protrusion -2b- that is thicker than the upper portion of the end portion -2a- and intended for being inserted in the inner first portion -8a- of the grooved segment -8- of the cam -6-. In order to assure the attachment between the ejector shaft -2- and the cam -6- and so that at the same time there can be a rotational movement, a magnet -9- has been provided housed inside a cavity made in the protrusion -2b- at the free end of the ejector shaft -2-.

Figure 2:
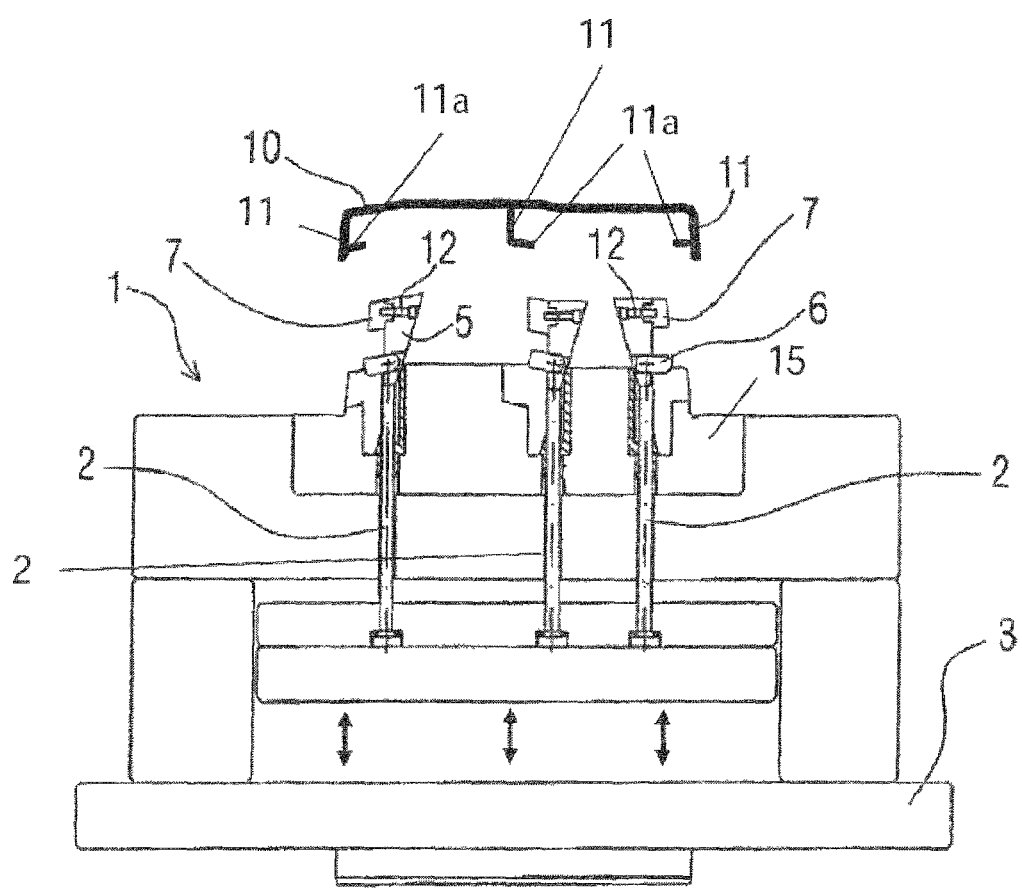
FIG. 2 is a schematic cross-section view of the mechanism depicted in the previous figure in the ejection position.

In the example illustrated in FIGS. 1 and 2, three slide mechanisms of the type described above are provided for manufacturing a plastic part -10- formed by a laminar segment with different planes and from which there project in the transverse direction three lower prolongations -11- with negatives -11a-, there having been provided a mechanism of the invention for each of the negatives -11a- such that the part -10- can be extracted vertically with respect to the horizontal plane of the mold, each ejector shaft -2- being shifted perpendicular with respect to the horizontal plane of the ejector plate -3-.

As can be seen in FIG. 4, the sliding support -4- comprises fixing means for fixing it to the injection mold -15- in the form of a housing -4d- which serves to receive a screw by means of which the sliding support -4- can be screwed to the mold -15- (see FIGS. 1 and 2), a guide bushing -4a- through which the ejector shaft -2- extends, a housing segment -4b- for the cam -6- and a slope -4c- emerging from a distal portion -4g- and through which the slide -5- slides when it is pushed or pulled by the ejector shaft -2- during the operations of moving forwards and backwards in the ejection step. For the purpose of facilitating the machining of the figure to be molded, the slide -5- can house an extractable detachable element -7-, which is susceptible of being independently machined, said detachable element -7- being fitted in a housing -13- of the slide -5- and anchored to the slide -5- by means of a screw -12-, as can be seen more clearly in FIG. 5.

Figure 6:
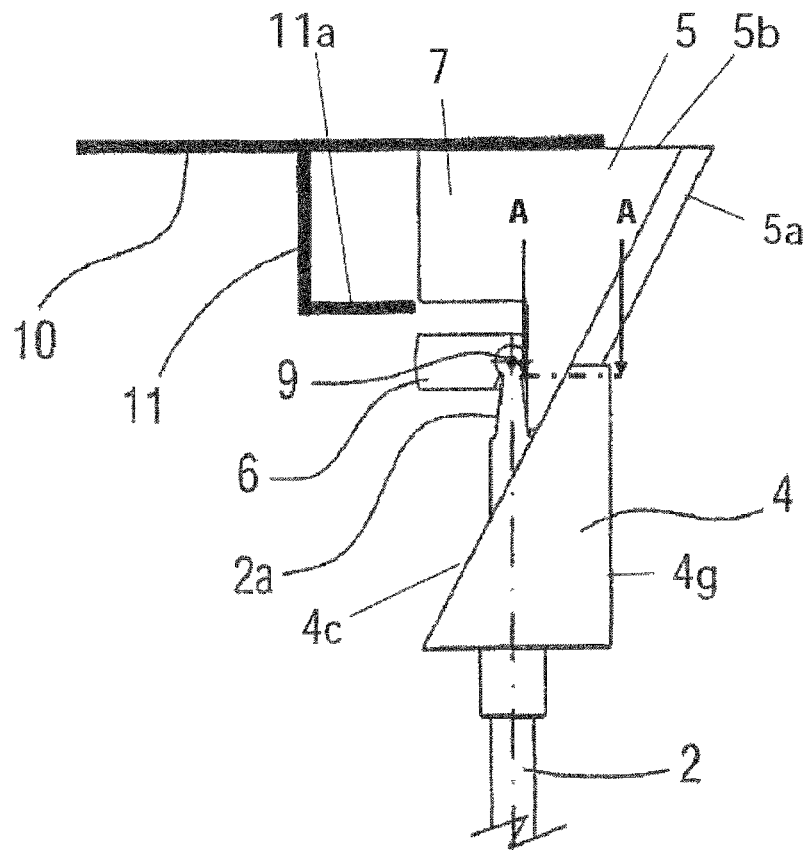
FIG. 6 is a detailed schematic elevational view of the mechanism of the invention for a plastic part with a negative at 90°.
Figure 8:
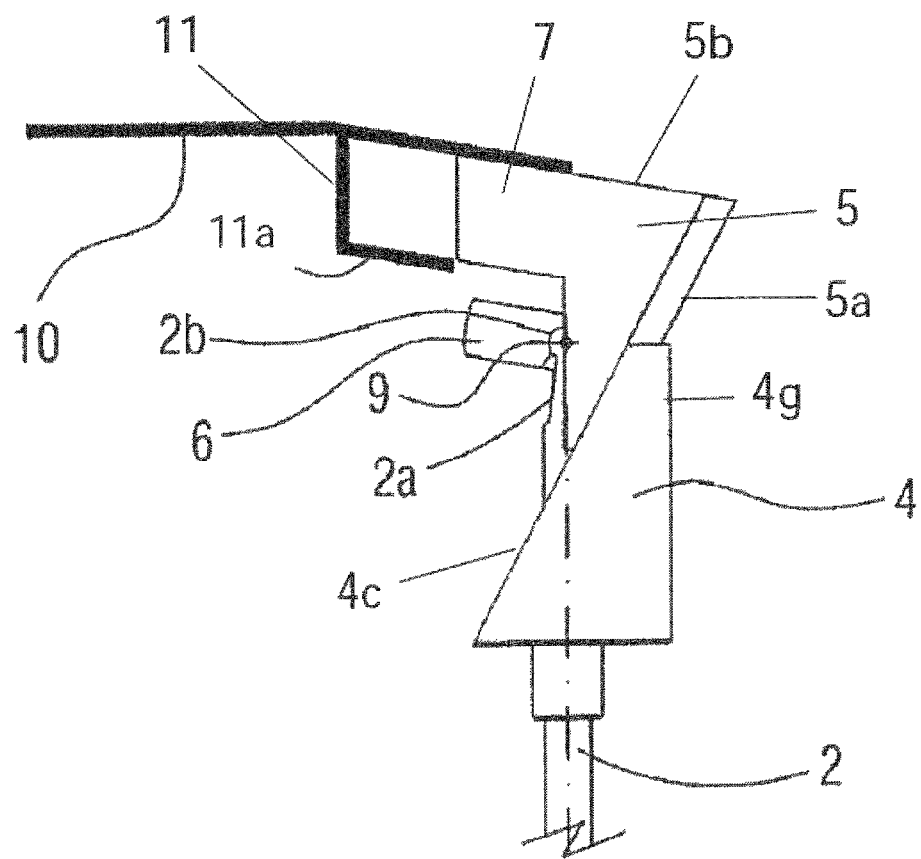
FIG. 8 is a detailed schematic elevational view of the mechanism of the invention for obtaining a second plastic part with a negative with an angle greater than 90°.

FIGS. 6 and 8 show respective embodiments of different parts to be obtained -10-. In these figures, it can be seen how the shaft -2- always works perpendicular with respect to the horizontal plane as a result of the allowance provided in the cam -6- regardless of the angle of the negative -11a-, such that the versatility of the mechanism -1- described can be clearly seen as a result of the oscillating or rotating movement of the cam -6- which is adapted to the angle of inclination of the negative -11a- with respect to said horizontal plane.

Figure 7:
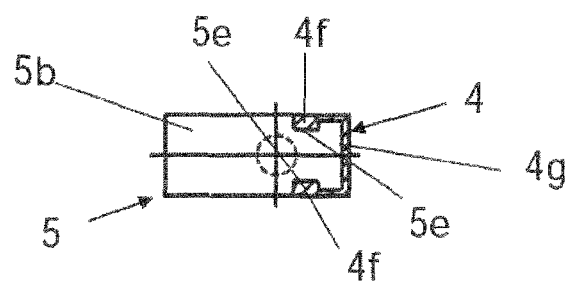
FIG. 7 is a schematic cross-section view along line A-A shown in FIG. 6.

As can be seen in FIG. 7, in the embodiment of the slide mechanism -1- shown in FIGS. 4-6, the slide -5- has respective side guiding recesses -5e- in which respective side guides -4f- of the sliding support -4- fit. The guiding recesses -5e- and the side guides -4f- have the same orientation as the slope -4c-. In turn, the side guides -4f- have the same height as the distal portion -4g- of the sliding support -4-, such that when the slide mechanisms -1- are in the molding position illustrated in FIG. 2, the upper portion of the side guides -4f- and the contact area with the part to be obtained of the distal portion -4g- leave a certain imprint on the lower surface of the part to be obtained -10-.

Figure 9:
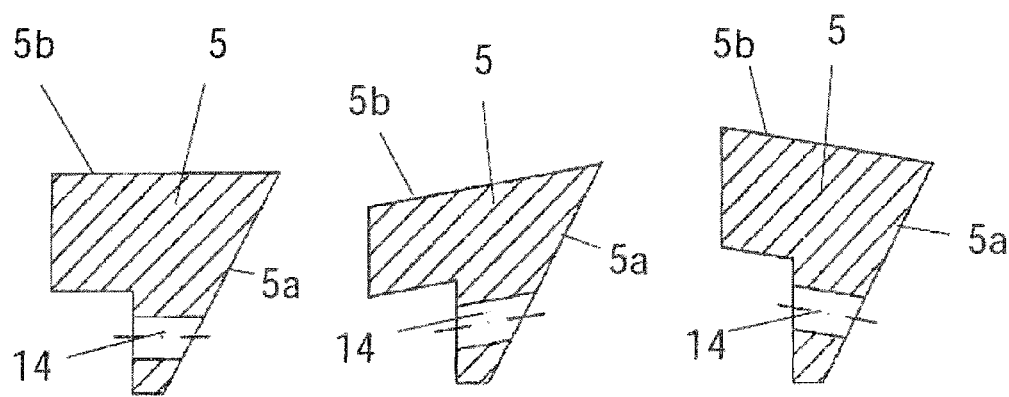
FIGS. 9A, 9B and 9C are schematic cross-section views corresponding to three embodiments for the machining of the sliding passage in a slide for negatives at 90°, at more than 90° or at less than 90° in relation to the ejector shaft.

In order to achieve the demolding of a negative with an angle parallel to the ejection surface, the cam -6- must slide in the sliding passage -14- machined in the slide -5- at 90° (FIGS. 7, 9A), whereas to demold a negative with an angle greater than 90° (FIGS. 8, 9C) or less than 90° (FIG. 9B), the cam -6- must slide in a sliding passage -14- machined in the slide -5- with the same angle as the section of the part to be molded -10-. The cam -6- is automatically adapted to the machined passages with determined tolerances. The cam -6- is coated with a lubricating product which facilitates sliding inside said sliding passage -14-.

Figure 11:
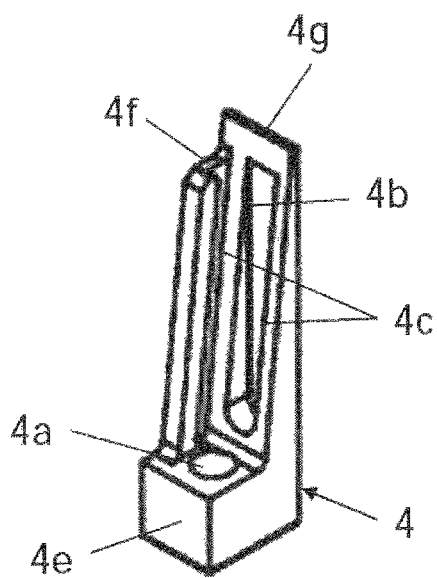
FIG. 11 is a schematic front perspective view of an alternative embodiment of a sliding support.

FIG. 11 shows an embodiment of the sliding support -4- comprising a distal portion -4g- from which there emerges a slope -4c- and with a central axial groove -4b- which acts as a housing for the cam -6-. A side guide -4f- is provided on one of the sides of the support -4-, and it extends axially from the base -4e- parallel to the slope -4c-, although it has a smaller length than the distal portion -4g-. The base -4e- is provided with a guiding passage -4a- in which the ejector shaft -2- slides.

Figure 12:
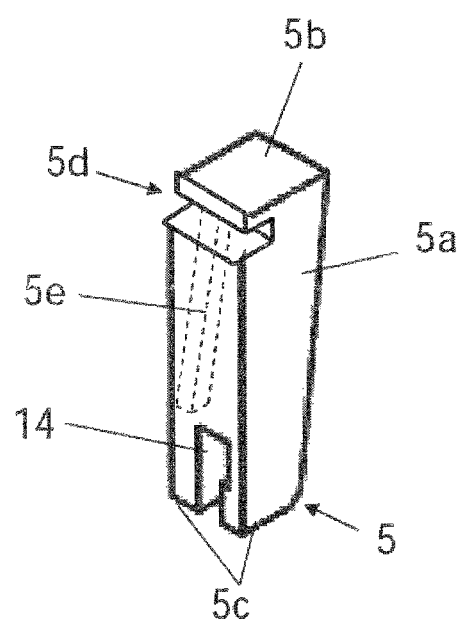
FIG. 12 is a schematic front perspective view of an embodiment of the slide combinable with the sliding support shown in FIG. 11.

FIG. 12 illustrates an embodiment of the complementary slide -5- with respect to the support -4- of FIG. 11. It can be observed that this slide -5- is wedge-shaped and comprises an inclined segment -5a- which extends from the base segment -5c- to the push surface -5b-, the inclined segment -5a- having the same inclination as the slope -4c- of the support -4-. In its lower portion, the slide -5- has a channel-shaped sliding passage -14- that is half open towards the ejector plate -3-, whereas in its upper portion it has a molding portion -5d- corresponding to a prolongation -11- with a negative -11a- of the part to be obtained -10-. In one of its sides, the slide -5- has a guiding recess -5e- with a complementary configuration and inclination with respect to the side guide -4f- of the sliding support -4-.

Figure 13:
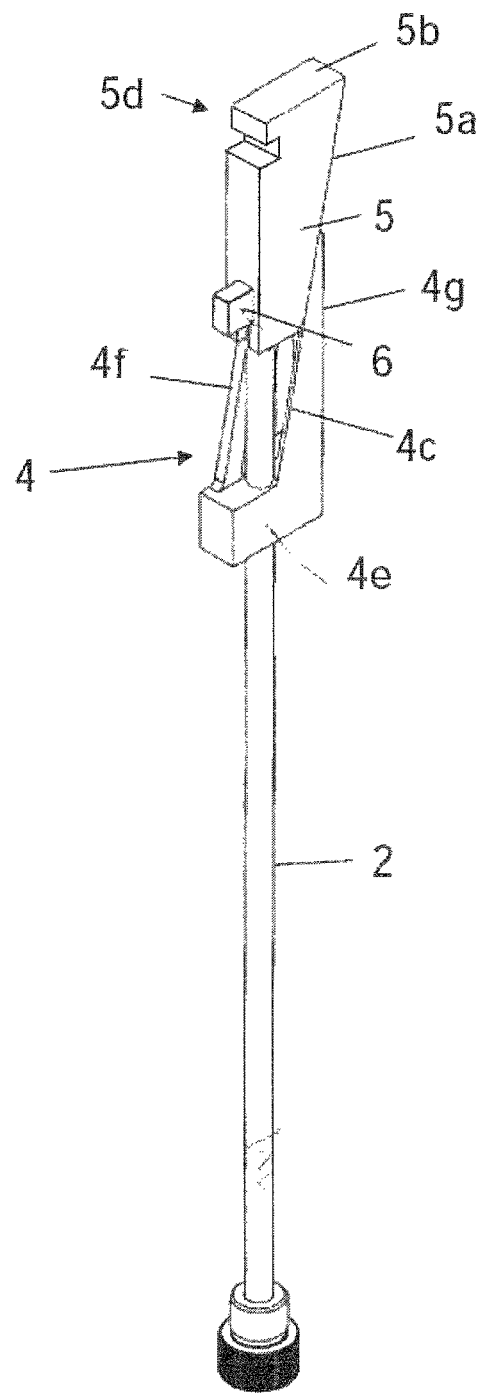
FIG. 13 is a schematic front perspective view of an embodiment of the slide mechanism in the demolding position and comprising the sliding support and the slide respectively illustrated in FIGS. 11 and 12.
Figure 14:
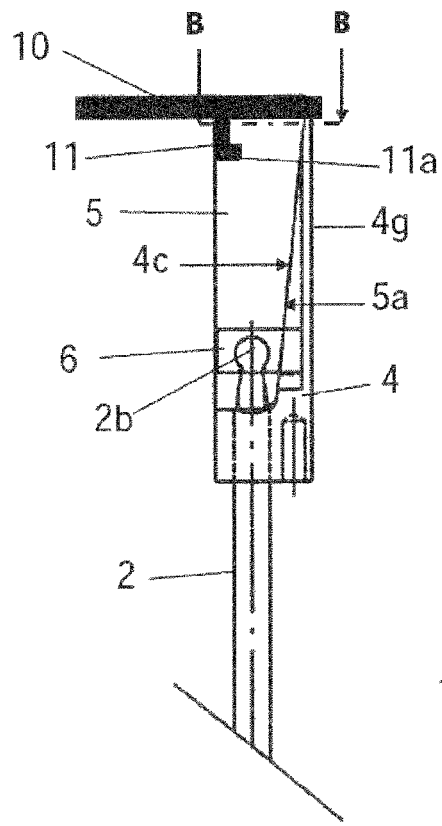
FIG. 14 is a schematic side cross-section view of the mechanism shown in FIG. 13 in the molding position.
Figure 15:
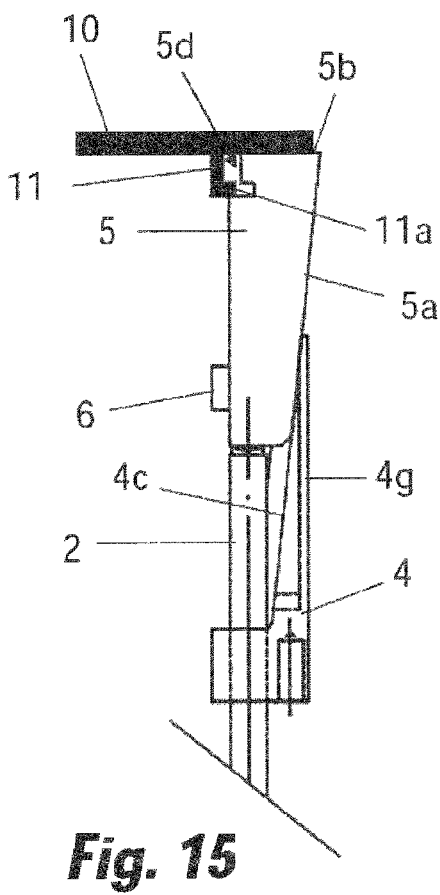
FIG. 15 is a schematic side elevational view of the mechanism shown in FIG. 13 in demolding position.
Figure 16:
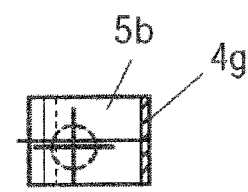
FIG. 16 is a schematic cross-section view along line B-B shown in FIG. 14.

FIGS. 13-16 show an embodiment of the slide mechanism incorporating the sliding support -4- and the slide -5- illustrated in FIGS. 12 and 13. In this embodiment, the ejector shaft -2- and the cam -6-, have configurations similar to those shown with respect to these elements in FIGS. 3, 6, 8 and 10, i.e., the ejector shaft -2- (see FIGS. 6, 8 and 10) is provided at its free end with a considerably conical end portion -2a- which ends in a protrusion -2b- that is thicker than the upper portion of the end portion -2a- and intended for being inserted in the inner first portion -8a- of the grooved segment -8- of the cam -6- (see FIG. 3). The cam -6- is slidably inserted in the sliding passage -14- in the slide -5- and also penetrates the central axial groove -4b-. As can be seen, the sides of the slide -5- are guided between the side guide -4e- of the sliding support -4- which fits in the guiding recess -5e-, and the cam -6- which extends through the sliding passage -14- and which can shift in the axial groove -4b-. Therefore, when the slide mechanism passes from the molding position shown in FIG. 14 to the demolding phase shown in FIG. 16, the ejector shaft -2- gradually pushes the cam -6- towards the part to be obtained -10- such that the cam -6- shifts the slide -5- with its inclined segment -5a- through the slope -4c- of the sliding support -4-. In this shifting, the slide -5- shifts, on one hand, towards a side such that its molding portion -5d- is separated from the negative -11a- of the lower prolongation -11- to which the slide mechanism -1- is assigned, and on the other hand, once the molding portion -5d- has been separated from the negative -11a-, the push surface -5b- ejects the part to be obtained -10-. As can be seen in FIG. 14, in the molding position the free end of the distal portion -4g- of the sliding support -4- is in contact with the lower surface of the part to be obtained -10- and, therefore, it leaves an imprint on said surface. Nevertheless, in view of the fact that, as already discussed in relation to FIG. 11, the side guide -4f- of the sliding support has a height that is less than that of the distal portion -4g-, the side guide does not leave an imprint in the lower portion of the part to be obtained -10-.

FIGS. 17-20 show an embodiment of how the ejector shafts -2- can be anchored in an ejector plate -3- by means of a cylindrical anchoring part -16- comprising an axial blind hole -16a-, an outer parametric step -16b- and an anti-rotation washer -16c- arranged in the body of the part -16-. The parametric step -16b- makes the anchoring part -16- have a first cylindrical portion with a diameter greater than that of the second cylindrical portion.

The anchoring plate -3- is made up of an anchoring plate 3' which has a through hole -3a-, and a bottom plate -3"- screwed by means of screws -17- to the anchoring plate -3'-. For the screwing, the bottom plate -3"- is provided for each screw -17- with a passage -17a- through which the screw -17- passes, whereas the anchoring plate -3'- comprises a threaded hole -17b- in which the screw -17- is screwed.

The anchoring part -16- is inserted in the through hole -3a- of the anchoring plate -3'- comprising a narrowed segment in the outer portion of the ejector plate -3- and a wider segment in the body of the anchoring plate -3"-. These segments of the through hole -3a- are respectively sized in correspondence with the first and the second cylindrical portion of the anchoring part -16-, such that the first cylindrical portion of the anchoring part -16- extends through the narrowed segment of the through hole -3a- whereas the second cylindrical portion is inserted in the wider segment of the through hole -3a-, the perimetric step -16b- being supported against the edge of the narrowed segment of the through hole -3a-. The wider portion of the through hole -3a- is closed by the bottom plate -3"- such that the anchoring part -16- is axially immobilized between the narrowed segment of the through hole -3a- and the bottom plate 3".

The anti-rotation washer -16c- can be made of a material such as synthetic rubber or fluoropolymer elastomer which is resistant to temperature and mechanical stress to which they are subjected in the operation of the mold.

Figure 17:
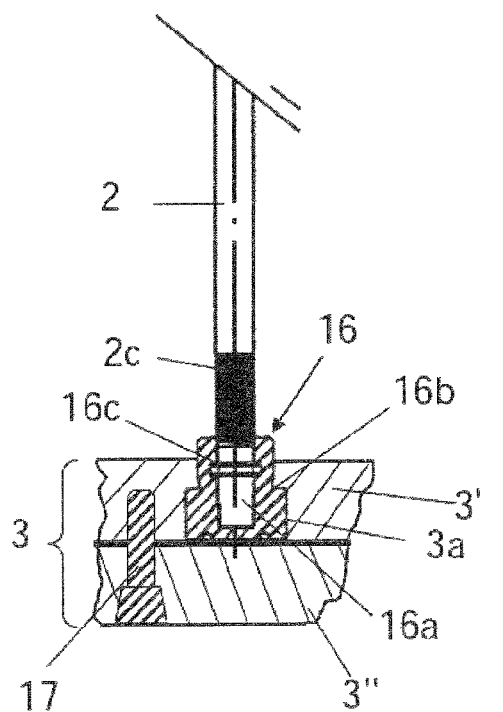
FIG. 17 is a schematic view of an embodiment of the anchor of the ejector shaft in the ejector plate prior to the insertion of the ejector shaft in an anchoring part.
Figure 18:
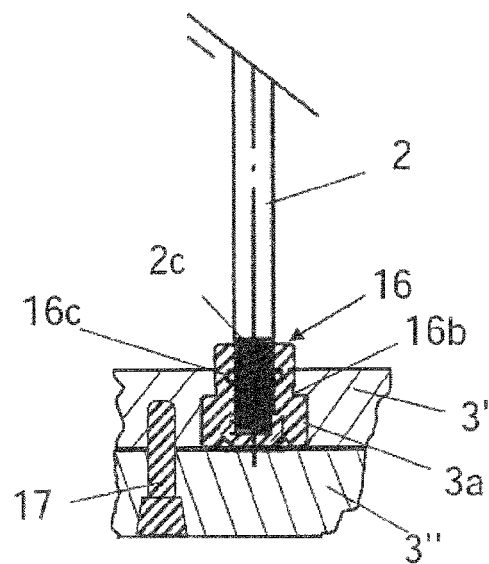
FIG. 18 is a schematic view of an embodiment of the anchor shown in FIG. 17 after the ejector shaft has been inserted in an anchoring part.
Figure 19:
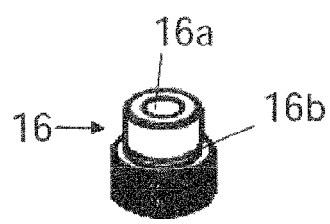
FIG. 19 is a schematic perspective view of the anchoring part shown in FIGS. 17 and 18.
Figure 20:
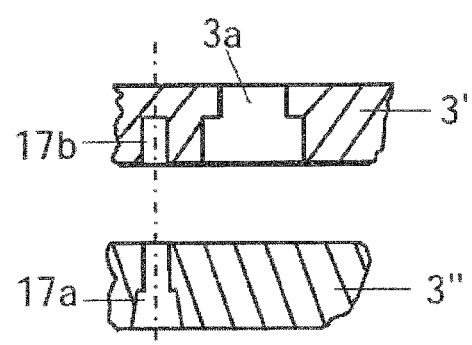
FIG. 20 is a cross-section view of the ejector plate shown in FIGS. 17 and 18.

As can be seen in FIGS. 17 and 18, the ejector shaft -2- comprises a threaded end -2c- screwed in the blind hole -16a- with the anti-rotation washer -16c- of the anchoring part -16-. Before screwing the ejector shaft -2- in the anchoring part -16-, the desired length of the ejector shaft is obtained by cutting a portion of the mentioned threaded end -2c-. When the threaded end -2c- is screwed in the anchoring part -16-, the anti-rotation washer -16c- prevents the rotation of the threaded end -2c- and, therefore, its unscrewing.

With this form of anchoring the ejector shafts by means of the elements shown in FIGS. 17-20, each ejector shaft -2- is effectively immobilized both in relation to its radial position (an anti-rotation effect is produced by the action of the anti-rotation washer -16c- ) and in relation to its axial position.

The invention claimed is:

1. A slide mechanism for the molding and ejection of parts molded with negatives for an injection mold, the slide mechanism comprising
at least one ejector shaft with a first end portion attached to a mobile ejector plate which shifts in an axial plane, and a second end portion coupled by means of a coupling element to a slide comprising a molding portion provided with a geometry of at least one negative of a molded part which extends through the slide, a base segment and a push surface which are in contact with the molded part during molding, as well as a radially inclined segment with respect to said axial plane;

a fixed sliding support with a slope with a complementary inclination with respect to the inclination of the inclined segment of the slide and on which the inclined segment of the slide shifts, and with a base provided with an axial guiding passage through which the ejector shaft axially slides;

wherein the slide comprises a sliding passage which extends through the slide at least partially and in parallel with the negative;

wherein the coupling element is attached to the second end portion of the ejector shaft and fits at least partially in a sliding manner in the sliding passage; and wherein the coupling element is a cam, and the second end portion of the ejector shaft ends in a protrusion coupled to the cam, the protrusion acting as a rotation shaft on which the cam can oscillate.

2. The slide mechanism according to claim 1, wherein the second end portion of the ejector shaft is conical.

3. The slide mechanism according to claim 1, wherein the protrusion has a diameter greater than the end of said second end portion of the ejector shaft.

4. The slide mechanism according to claim 1, wherein the protrusion is cylindrical.

5. The slide mechanism according to claim 1, wherein the cam comprises a grooved segment provided with an inner first portion having a circle segment section in which the protrusion of the ejector shaft is housed, a restriction-type intermediate portion and an outer third portion having facing side walls inclined convergently towards the intermediate portion, the protrusion being housed in the first portion of the grooved segment of the cam such that the cam can oscillate in said protrusion.

6. The slide mechanism according to claim 1, wherein the protrusion arranged at the end of the ejector shaft comprises a magnet.

7. The slide mechanism according to claim 6, wherein the magnet is housed inside a cavity provided in the protrusion.

8. The slide mechanism according to claim 1, wherein the slide is a wedge-shaped element in which the inclined segment extends between the push surface and the base segment which is narrower than the push surface.

9. The slide mechanism according to claim 1, wherein the sliding passage is tunnel-shaped.

10. The slide mechanism according to claim 9, wherein the sliding passage extends through the slide close to the base segment.

11. The slide mechanism according to claim 1, wherein the sliding passage is in the shape of a channel that is at least half open towards the ejector plate.

12. The slide mechanism according to claim 1, wherein the sliding support is fixed to the injection mold.

13. The slide mechanism according to claim 12, wherein the sliding support comprises fixing means for fixing it to the injection mold.

14. The slide mechanism according to claim 1, wherein the slide comprises a detachable element which can be assembled in an adaptable portion of the slide.

15. The slide mechanism according to claim 1, wherein the sliding support comprises at least one side guide which enters a guiding recess of the slide, the side guide and the guiding recess having the same orientation as the slope of the sliding support.

16. The slide mechanism according to claim 1, wherein the sliding support comprises two side guides which respectively enter respective guiding recesses provided on opposite sides of the slide, the side guides and the guiding recesses having the same orientation as the slope of the sliding support.

17. The slide mechanism according to claim 1, wherein the first end of the ejector shaft is a threaded end which can be screwed in a complementary hole in the ejector plate.

18. The slide mechanism according to claim 1, wherein the first end of the ejector shaft is a threaded end which can be screwed in a hole of an anchoring part immobilized in a complementary hole in the ejector plate.

19. The slide mechanism according to claim 18, wherein
the ejector plate comprises an anchoring plate comprising said complementary hole, and a bottom plate attached to one another;
the anchoring part is cylindrical and comprises a first portion, a second portion and a perimetric step between the first and the second portion, the first portion having a smaller diameter than the second portion;
the hole in the anchoring plate is a through hole, with a narrowed segment in the outer portion of the anchoring plate and a wider segment in the body of the anchoring plate said segments of the through hole being respectively sized in correspondence with the first and the second cylindrical portion of the anchoring part, such that the first cylindrical portion of the anchoring part is housed in the narrowed segment of the through hole and the second cylindrical portion is inserted in the wider segment of the through hole, the perimetric step being supported against the edge of the narrowed segment of the through hole;
the bottom plate closes the wider segment of the through hole in the anchoring plate.

20. The slide mechanism according to claim 17, wherein the hole in which the threaded end of the ejector shaft is screwed is provided with an anti-rotation element.

21. The slide mechanism according to claim 17, wherein the anti-rotation element is at least one washer.

22. The slide mechanism according to claim 8, wherein the coupling element is a bar fixedly attached to the second end of the ejector shaft.

* * * * *